Figure 3:
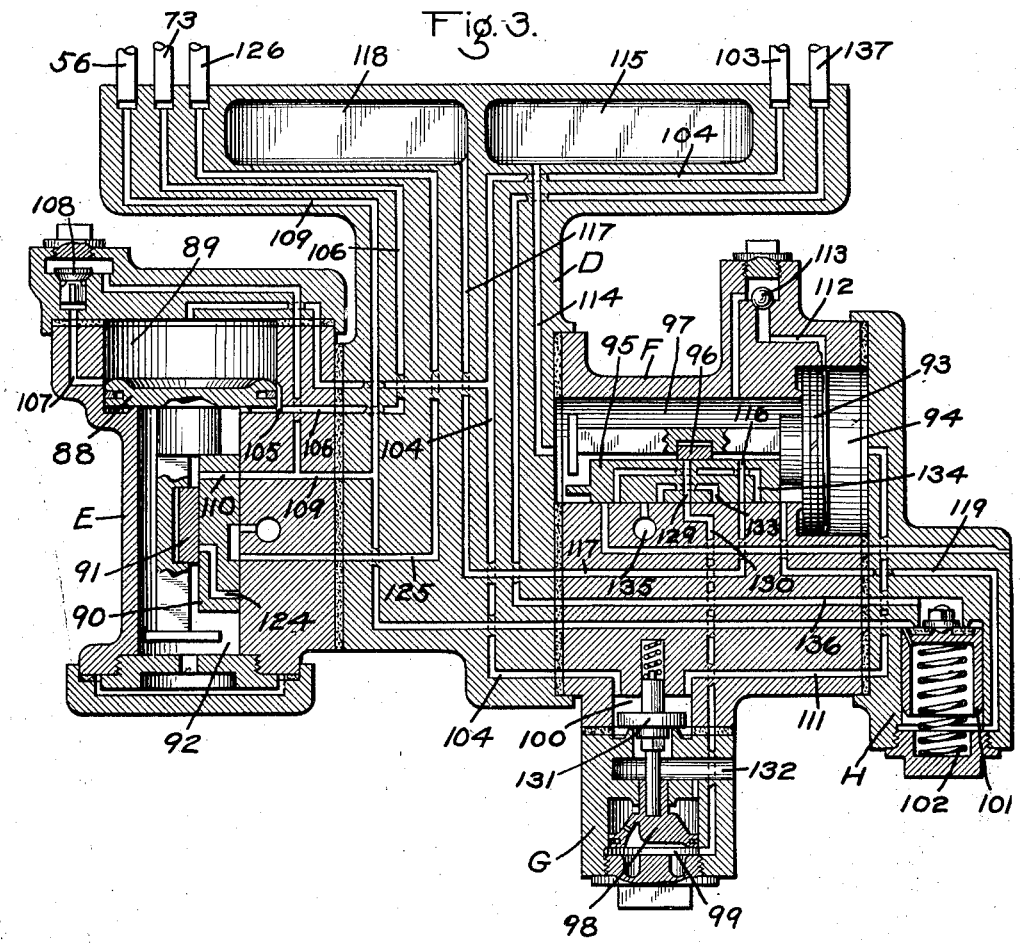

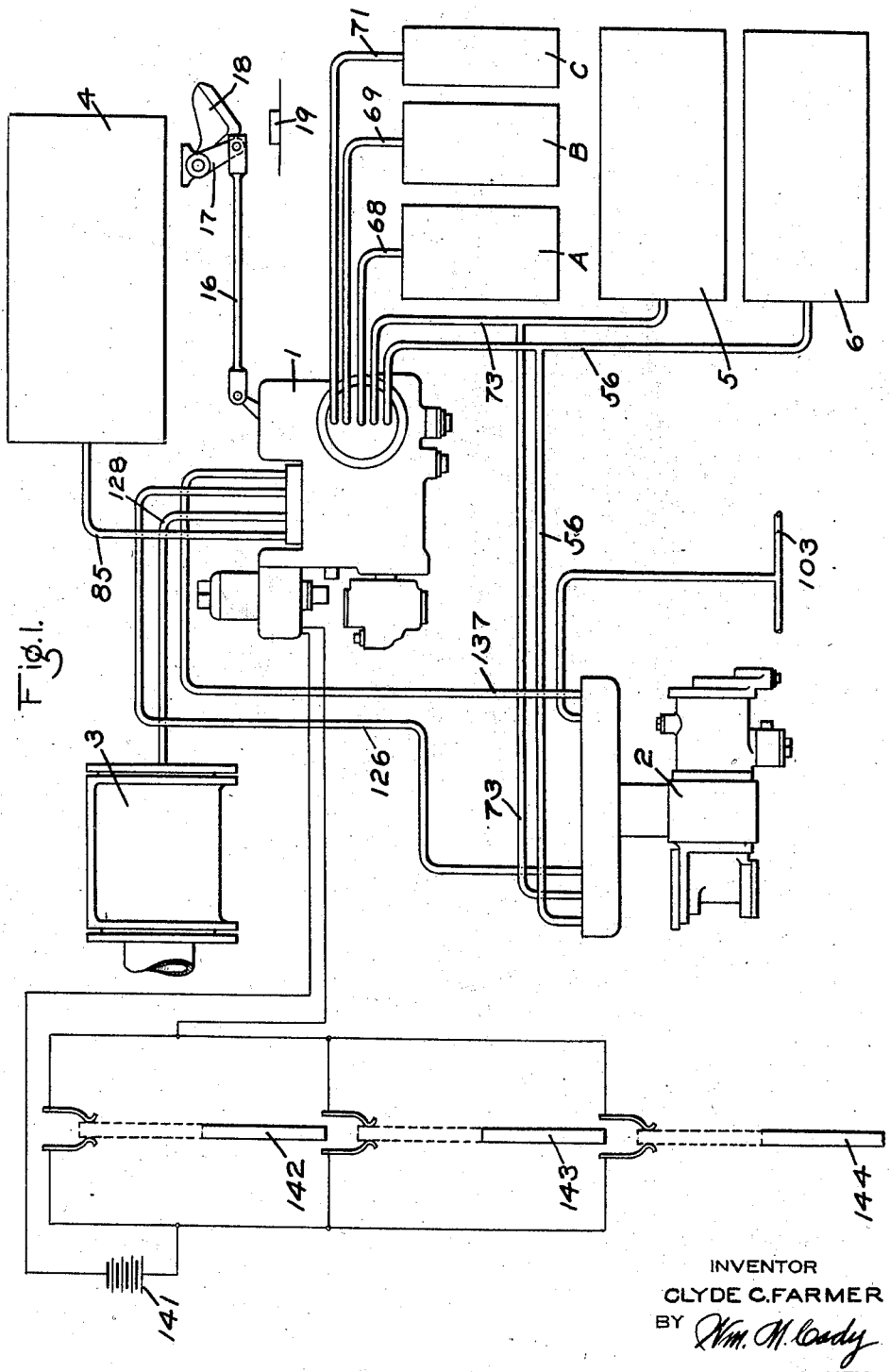

Jan. 25, 1927.
C. C. FARMER
1,615,369
VARIABLE LOAD BRAKE
Filed April 3, 1925
3 Sheets-Sheet 2
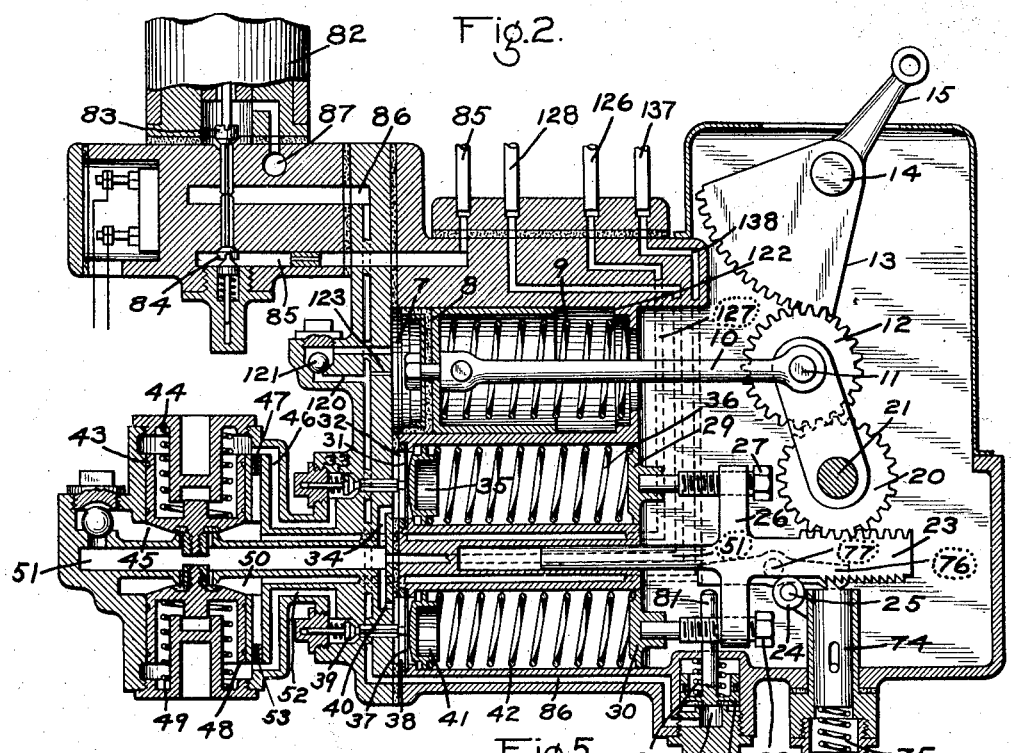
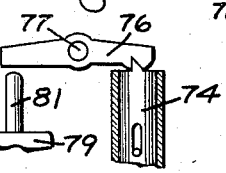
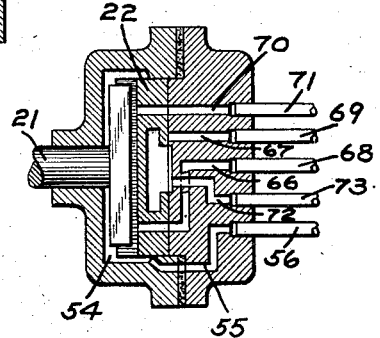
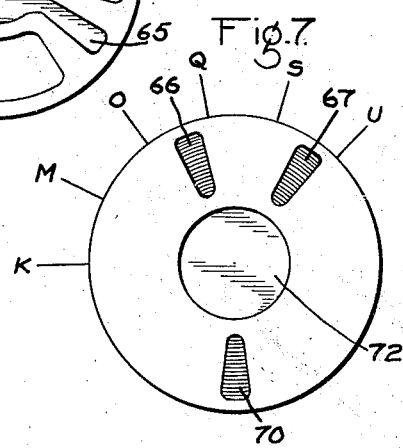
INVENTOR
CLYDE C. FARMER
BY Wm. M. Cady
ATTORNEY Jan. 25, 1927.  1,615,369
C. C. FARMER
VARIABLE LOAD BRAKE
Filed April 3, 1925     3 Sheets-Sheet 3

INVENTOR
CLYDE C. FARMER
BY
ATTORNEY

Patented Jan. 25, 1927.

1,615,369

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

VARIABLE-LOAD BRAKE.

Application filed April 3, 1925. Serial No. 20,327.

This invention relates to load regulated brakes and is in the nature of an improvement on the type of variable load brake apparatus disclosed in prior Patent No. 1,265,001 of Walter V. Turner, dated May 7, 1918.

In the accompanying drawings; Fig. 1 is a diagrammatic view of a load regulated brake equipment with my invention embodied therein; Fig. 2 a diagrammatic sectional view of the load regulated valve mechanism; Fig. 3 a diagrammatic sectional view of the brake application and release valve device employed; Fig. 4 a sectional view of the rotary valve device used in the load regulated valve mechanism; Fig. 5 a detail of the locking mechanism used in the load regulated valve mechanism; Fig. 6 a face view of the rotary valve; and Fig. 7 a plan view of the rotary valve seat.

As shown in Fig. 1 of the drawings, the equipment may comprise a load regulated valve mechanism 1, a brake application and release valve device 2, a brake cylinder 3, a main reservoir 4, an auxiliary reservoir 5, a supplementary reservoir 6, and additional reservoirs A, B, and C.

The load regulated valve mechanism, as shown in Fig. 2 of the drawings, may comprise a casing having a piston cylinder 7 containing a piston 8, subject on one side to the pressure of a spring 9. Piston 8 is provided with a piston stem 10 carrying a pin 11 at its outer end on which is mounted a pinion 12. Said pinion meshes with the teeth of a gear segment 13, which is mounted on a pin 14 secured to the casing, and which is provided with an arm 15 pivotally connected to one end of a strut member 16. The other end of the strut member 16 is attached to one arm 17 of a bell crank carried by the car body. The other arm 18 of the bell crank is adapted to engage a member 19 carried by the car truck, as more clearly shown in Fig. 1 of the drawings.

Also meshing with the pinion 12 is a gear 20, which is rigidly attached to the stem 21 of a rotary valve 22, as shown in Fig. 4 of the drawings. The teeth of gear 20 are adapted to mesh with the teeth of a rack 23, which is guided and supported by a rod-like extension fitting into a bore in the casing. A roller 24 mounted on a pin 25 secured to the casing provides a support for the outer end of rack 23. The rack 23 carries a crosshead 26 having set screws 27 and 28, which engage respectively the spring plates 29 and 30.

The spring plates 29 and 30 are respectively associated with service and emergency brake cylinder pressure limiting valve devices. The service limiting valve device may comprise a diaphragm 31 contained in diaphragm chamber 32 and adapted to operate a valve 33. The diaphragm 31 is subject on one side to the pressure of fluid in brake cylinder 3, as supplied thereto through pipe 128, passage 51, and passage 34, and on the opposite side, through the diaphragm follower 35, to pressure exerted by spring 36, which in turn is engaged by the plate 29.

The emergency brake cylinder pressure limiting valve device may comprise a diaphragm 37 contained in diaphragm chamber 38 and adapted to operate a valve 39. The diaphragm 37 is subject on one side to the pressure of fluid in the brake cylinder as supplied from chamber 51 through passage 40, and on the opposite side, through the diaphragm follower 41, to the pressure exerted by spring 42 which in turn is engaged by spring plate 30.

Also provided in the casing are service and emergency brake cylinder supply valve devices. The service brake cylinder supply valve device may comprise a valve piston 43, subject on one side to the pressure of a spring 44 and on the outer seated area of the opposite side to the pressure of fluid in a chamber 45, the inner seated area being exposed to the pressure of fluid in chamber 51 and consequently the brake cylinder. The fluid pressure on the spring side of valve piston 43 is controlled by valve 33 to which it is connected by passage 46 and a restricted passage 47 connects the spring side of said valve piston to chamber 45.

The emergency brake cylinder supply valve device may comprise the valve piston 48, subject on one side to the pressure exerted by a spring 49, and on the outer seated area of the opposite side to the pressure of fluid in a chamber 50, the inner seated area being exposed to the pressure of fluid in chamber and passage 51, which is open to the brake cylinder 3. The fluid pressure on the spring side of valve piston 48 is controlled by valve 39 to which it is connected by passage 52 and the spring side of said valve piston is also connected to chamber 50 through a restricted port 53.

Formed in the casing is a rotary valve chamber 54, which is connected through passage 55 and pipe 56 to the supplementary reservoir 6, and which contains rotary valve 22. The rotary valve 22 is adapted under different load conditions to assume positions designated in Fig. 7 of the drawings as K, M, O, Q, S, and U, and is provided with through ports 57, 58, 59, and 60, and also a cavity 61 having radial extensions 62, 63, 64, and 65.

In position K of rotary valve 22, the through port 57 registers with passages 66 and 67 leading to the rotary valve seat and connected respectively by pipes 68 and 69 to the reservoirs A and B, and through port 58 registers with passage 70 leading to the rotary valve seat and connected by pipe 71 to the reservoir C so that rotary valve chamber 54 and consequently the supplemental reservoir 6 is connected to the reservoirs A, B, and C, thereby maintaining the pressure in said reservoirs at the pressure carried in the supplemental reservoir.

In position M the through port 57 still registers with the passages 66 and 67, thereby connecting the rotary valve chamber 54 and consequently the supplemental reservoir to reservoirs A and B. Port 58 in this position is cut off from passage 70 and cavity extension 63 registers with said passage, so that the reservoir C is now connected to the normal auxiliary reservoir 5.

In position O the through port 57 registers with passage 67 and through port 59 with passage 70 so as to connect the rotary valve chamber 54 and consequently the supplemental reservoir 6 to the reservoirs B and C, thereby maintaining said reservoirs charged. Also in this position cavity extension 62 registers with passage 66 so as to connect reservoir A to the normal auxiliary reservoir 5.

In position Q the through port 57 still registers with passage 67, connecting the valve chamber 54 to the reservoir B, while cavity extension 62 registers with passage 66 and cavity extension 64 with passage 70 so as to connect the reservoirs A and C to the normal auxiliary reservoir 5.

In position S port 60 registers with passage 70, thereby connecting valve chamber 54 to reservoir C. Cavity extension 62 registers with passages 66 and 67 so as to connect reservoirs A and B to the auxiliary reservoir 5.

Under full load conditions the rotary valve 22 will be rotated to position U in which cavity extension 62 registers with passages 66 and 67, and cavity extension 65 registers with passage 70 so as to connect the reservoirs A, B, and C to the normal auxiliary reservoir 5.

A pawl member 74, normally held in engagement with ratchet teeth provided on the under face of the rack 23 by a spring 75, is provided to lock the mechanism in adjusted position. For unlatching said pawl during the adjusting period, I provide a lever 76 pivotally mounted on a pin 77 secured in the casing. Disposed in the casing directly beneath one end of the lever 76 is a piston chamber 78 containing a piston 79 subject on one side to the pressure exerted by a spring 80 and having a stem 81, which is adapted upon an upward movement of the piston 79 to engage one end of the lever 76, and with pin 77 acting as a fulcrum point, cause the other end of said lever to engage the pawl member 74, so as to shift said member out of engagement with the ratchet teeth of the rack 23.

Attached to the casing is a magnet portion, which may comprise a magnet 82 adapted to operate double beat valves 83 and 84. The valve 84 is adapted to control communication from a passage 85, leading to the main reservoir 4, to a passage 86 which leads to the piston cylinder 7 and to the locking piston chamber 78, while the valve 83 controls communication from passage 86 to atmospheric exhaust port 87.

The magnet 82 is controlled by an electric circuit including a source of current 141, and which is adapted to be closed to cause the energization of said magnet, when one or more of the doors 142, 143, 144 are in open position, as shown in dotted lines in Fig. 1 of the drawings.

The brake application and release valve device 2 may comprise a pipe bracket portion D to which is attached service application portion E, an emergency application portion F, a quick action portion G, and a high pressure portion H.

The service application portion E may comprise a piston 88 contained in piston chamber 89 and adapted to operate a main slide valve 90 and an auxiliary slide valve 91 contained in a valve chamber 92.

The emergency application portion F may comprise a piston 93 contained in piston chamber 94 and adapted to operate a main slide valve 95 and an auxiliary slide valve 96 contained in valve chamber 97.

The quick action portion G may comprise a piston 98 contained in a piston chamber 99 and adapted to operate a brake pipe vent valve contained in a valve chamber 100.

The high pressure portion H may comprise the valve piston 101 subject on one side to the pressure of a spring 102 and on the outer seated area of the other side to the pressure of fluid in the supplemental reservoir 6, as supplied thereto through pipe 56 and passage 109, and on the inner seated area to the pressure of fluid supplied to pipe 137.

In operation, fluid under pressure from the brake pipe 103 flows through passage 104 to chamber 100 and to piston chamber 89, forcing piston 88 to its innermost position. Fluid now flows through feed groove 105 to valve chamber 92, thence through passage 106 and pipe 73 to the auxiliary reservoir 5, charging the same. The supplementary reservoir C is charged from the piston chamber 89 through passage 107 past check valve 108 through passage 109 and pipe 56, also from valve chamber 92 through port 110 in slide valve 90 and thence through passage 109 and pipe 56.

Fluid from chamber 100 flows through passage 111 to piston chamber 94, forcing piston 93 to its innermost position. From piston chamber 94 fluid flows through passage 112 past ball check 113 to valve chamber 97, thence through passage 114 to quick action chamber 115. Fluid from valve chamber 97 also flows through port 116 in slide valve 95 and passage 117 to quick action closing chamber 118, charging said chamber. A passage 119 also supplies fluid from valve chamber 97 to the spring side of high pressure valve 101.

Assuming the load valve mechanism to be in empty car position, the rotary valve 22 will be in position K, in which as hereinbefore described, port connections are made so that the supplemental reservoir 6 is connected to the reservoirs A, B, and C in order to maintain said reservoirs charged with fluid under pressure.

When the car is brought to a stop and the doors opened, the electric control circuit of magnet 82 will be closed as hereinbefore described so as to thereby energize said magnet. The energization of magnet 82 seats the valve 83 and unseats valve 84, permitting fluid under pressure from the main reservoir 4 to flow through pipe and passage 85 past unseated valve 84, thence through passage 86 to piston chamber 78 of the unlocking piston and through passage 120 past ball check 121 to piston cylinder 7.

The area of the piston 79 exposed to fluid supplied to passage 86 and the pressure of spring 80 is such that the piston 8 will be moved outwardly by fluid under pressure supplied to passage 86, before the piston 79 will be lifted from its seated position and consequently, the pawl member 74 will be held in engagement with the ratchet teeth of the rack 23, locking the rack against outward movement, until piston 8 has moved out its full stroke.

As the piston 8 moves out, any tendency of the gear 12 to rotate in a counterclockwise direction, and the gear 20 to be thereby rotated in a clockwise direction, is resisted by the springs 36 and 42, acting through the rack bar 23, so that as said piston moves outwardly, the pinion 12 will roll in a clockwise direction on gear 20. This movement of pinion 12 results in a counterclockwise rotation of the gear segment 13 and the arm 15. The counterclockwise rotation of the arm 15 causes a movement of the strut member 16 toward the left, which acts to bring the arm 18, of the bell crank, carried by the car body, into engagement with the member 19, which is carried by the car truck.

If the load on the car is now increased, the car springs will be compressed, forcing the member 19 upwardly, thereby exerting a pull on the strut member 16 and consequently on arm 15 of the gear segment 13. The gear segment 13 is then rotated in a clockwise direction about pin 14, causing the pinion 12 to rotate in a counterclockwise direction, which in turn causes the gear 20 to rotate in a clockwise direction, thereby moving the rack 23 to the left so as to compress the limiting valve springs 36 and 42.

The clockwise rotation of gear 20 also rotates the stem 21 and consequently rotary valve 22 so that one or more of the cavity extensions 62, 63, 64, and 65 will register with passages 66, 67, and 70 leading to the rotary valve seat, thereby connecting one or more of the reservoirs A, B, and C to the normal auxiliary reservoir 5, according to the extent the gear 20 is rotated, which in turn is dependent upon the load on the car.

It will be evident that if the load on the car is decreased, the action will be reversed, permitting the rack 23 to move to the right, relieving part of the pressure exerted on the limiting valve springs 36 and 42 by the respective spring plates 29 and 30. At the same time, gear 20 and consequently stem 21 of the rotary valve 22 will be rotated in a counterclockwise direction, thereby cutting off communication from one or more of the reservoirs A, B, and C to the normal auxiliary reservoir 5, according to the amount the load is reduced.

When the doors of the car are closed, the magnet 82 is deenergized, causing valve 84 to seat and valve 83 to be unseated, which opens communication from passage 86 and piston chamber 78 of the locking piston 79 to the atmosphere, past unseated valve 83 through atmospheric port 87, thereby permitting piston 79 to move downwardly and thus allowing the pawl 74 to engage the ratchet teeth of rack 23 so as to lock the parts in their adjusted position while the car is running. In releasing fluid from the piston 8, the ball check valve 121 prevents exhaust through the large supply passage 120, so that fluid can only exhaust through the restricted passage 123, thereby assuring the downward movement of piston 79, and the consequent engagement of pawl 74 with the ratchet teeth of the rack bar 23, so as to lock the parts in their load adjusted position before the piston 8 moves upwardly.

If a service application of the brakes is effected in order to bring the car to a stop at the next loading place, the usual reduction of pressure in the brake pipe 103 causes piston 88 and consequently main slide valve 90 and auxiliary slide valve 91 of service application valve device E to move to service position.

With slide valve 90 and auxiliary slide valve 91 in this position, fluid under pressure from the auxiliary reservoir 5 and valve chamber 92 flows through port 124 in slide valve 90, passage 125 and pipe 126 to load regulated valve mechanism 1, thence through passage 127 to chamber 45 below the service brake cylinder supply valve 43. The fluid under pressure, building up in chamber 45, raises the valve 43, against the pressure exerted by spring 44, permitting fluid to flow from chamber 45 through passage 51 and pipe 128 to the brake cylinder 3.

The limiting valve 33 remains unseated so long as the pressure of fluid supplied to the brake cylinder 3 and as supplied through pipe 128, passages 122, 51, and 34, to one side of diaphragm 31, is less than the pressure exerted by spring 36 on the opposite side of said diaphragm. The limiting valve 33 being unseated, fluid from chamber 45 flowing through the choked passage 47 to the spring side of valve piston 43, is vented through passage 46, past unseated valve 33 to diaphragm chamber 32, thence through passage 34 to passage 51 and the brake cylinder 3, so that the fluid pressure on the spring side of valve piston 43 is prevented from building up so long as the valve 33 remains open. When the pressure of fluid in the brake cylinder and in diaphragm chamber 32 has been increased to a degree sufficient to overcome the pressure exerted on the opposite side of the diaphragm 31 by the spring 36, the diaphragm 31 will be moved to the right, permitting the limiting valve 33 to be seated by its spring.

The seating of limiting valve 33 cuts off communication from the spring side of the supply valve 43 to the brake cylinder and thereby permits fluid from chamber 45 to equalize on opposite sides of the supply valve 43 through choked passage 47, so that spring 44 will seat said supply valve and prevent further flow of fluid to the brake cylinder.

If an emergency application of the brakes is initiated by a sudden reduction of pressure in the brake pipe 103, the piston 93 of the emergency application valve will move to emergency position, shifting the slide valves 96 and 95 so as to first connect the valve chamber 97 to quick action piston chamber 99 through port 129 in slide valve 95 and passage 130, and finally connecting the quick action closing chamber 118 to said piston chamber through passage 117, cavity 133 in slide valve 95, and passage 130. The fluid under pressure from valve chamber 97 and quick action closing chamber 118 acting on quick action piston 98 forces said piston upwardly to unseat valve 131 and cause a serial venting of the brake pipe in the usual way.

In an emergency position of the slide valve 95, a connection is also made from the spring side of the high pressure valve 101 to atmosphere by way of passage 119, cavity 134 in slide valve 95, and atmospheric exhaust port 135 in the slide valve seat.

The venting of fluid from the spring side of valve piston 101 permits fluid under pressure from the supplemental reservoir 6 acting on the outer seated area of the opposite side to raise said valve against the pressure exerted by spring 102 and flow through passage 136, pipe 137 to the load regulated valve mechanism 1, thence through passage 138 to chamber 50 at one side of emergency brake cylinder supply valve 48.

The fluid pressure building up in chamber 50 raises the supply valve 48 against the pressure of spring 49 and this permits the flow of fluid through passage 51 and pipe 128 to brake cylinder 3. When fluid under pressure in the brake cylinder 3, which is supplied to diaphragm chamber 38 through passage 40, has built up to a degree sufficient to overcome the pressure exerted by spring 42 on the opposite side of said diaphragm, the brake cylinder pressure will move the diaphragm 37 to the right so as to permit the valve 39 to be seated by its spring. The seating of valve 39 cuts off communication from the spring side of supply valve 48 to the brake cylinder and permits fluid from chamber 50 to equalize, through choked passage 53, on opposite sides of the valve 48, so that spring 49 will seat said valve and prevent further flow of fluid to the brake cylinder.

Having now described my invention, what I claim as new and desire to secure by Letters Patent, is:

1. In a load brake, the combination with means for regulating the braking power, of a movable member for adjusting said means and provided with a toothed rack, mechanism movable according to the load on the car and including a gear segment, and gears connecting said rack with said gear segment.

2. In a load brake, the combination with means for regulating the braking power, of a movable member for adjusting said means and provided with a toothed rack, mechanism movable according to the load on the car and including a gear segment, gears connecting said rack with said gear segment, and a fluid pressure operated piston for imparting a translational movement to one of said gears.

3. In a load brake, the combination with means for regulating the braking power, of a movable member for adjusting said means and provided with a toothed rack, mechanism movable according to the load on the car and including a gear segment, meshing gears, one meshing with said toothed rack and the other with said gear segment, and a fluid pressure operated piston operatively connected to the gear meshing with the gear segment for effecting a translational movement of said gear.

4. In a load brake, the combination with a movable member fixed to the car body, a stationary member fixed to the car truck, and a rod for operating said movable member to cause said movable member to engage said stationary member, of a gear segment for operating said rod, means for varying the braking power and including a movable toothed rack, gears connecting said gear segment with said toothed rack, and a fluid pressure operated piston for imparting a translational movement to one of said gears, to thereby operate said gear segment and cause said movable member to engage said stationary member.

5. In a load brake, the combination with a movable member fixed to the car body and a stationary member fixed to the car truck, of a gear operatively connected to said movable member and adapted upon a movement of translation to cause said movable member to engage said stationary member, and means operated upon rotation of said gear for varying the braking power.

6. In a load brake, the combination with a movable member fixed to the car body and a stationary member fixed to the car truck, of a gear operatively connected to said movable member and adapted upon a movement of translation to cause said movable member to engage said stationary member, a fluid pressure operated piston for imparting a translational movement to said gear, and means operated upon a rotative movement of said gear for varying the braking power.

7. In a load brake, the combination with mechanism movable to an operative position in which said mechanism is moved according to the load on the car, of a gear rotatable by the movement of said mechanism, and means operated upon rotation of said gear for adjusting the braking power according to the load on the car, said mechanism being movable to and out of said operative position by a translational movement of said gear.

8. In a load brake, the combination with mechanism movable to an operative position in which said mechanism is moved according to the load on the car, of a gear rotatable by the movement of said mechanism, means operated upon rotation of said gear for adjusting the braking power according to the load on the car, said mechanism being movable to and out of said operative position by a translational movement of said gear, and a fluid pressure operated piston for imparting a translational movement of said gear.

9. In a load brake, the combination with an auxiliary reservoir and a plurality of reservoirs, of a rotary valve having positions for connecting one or more of said reservoirs to the auxiliary reservoir, and means operated according to the load on the car for operating said rotary valve.

10. In a load brake, the combination with an auxiliary reservoir and a plurality of reservoirs, of a rotary valve having positions for connecting one or more of said reservoirs to the auxiliary reservoir, and means operated according to the load on the car for rotating said valve.

11. In a load brake, the combination with an auxiliary reservoir and a plurality of reservoirs, of a rotary valve having positions for connecting one or more of said reservoirs to the auxiliary reservoir, means for regulating the braking power, means including a gear for operating said regulating means according to the load on the car, said rotary valve being rotatable with said gear.

In testimony whereof I have hereunto set my hand.

CLYDE C. FARMER.